United States Patent
Mori et al.

[11] Patent Number: 5,902,931
[45] Date of Patent: May 11, 1999

[54] VIBRATION GYROSCOPE

[75] Inventors: Akira Mori, Nagaokakyo; Akira Kumada, Otsu, both of Japan

[73] Assignee: Murata Manufacturing Co., Ltd., Japan

[21] Appl. No.: 08/840,030

[22] Filed: Apr. 24, 1997

[30] Foreign Application Priority Data

| Apr. 26, 1996 | [JP] | Japan | 8-131069 |
| Apr. 26, 1996 | [JP] | Japan | 8-131070 |
| Apr. 26, 1996 | [JP] | Japan | 8-131071 |

[51] Int. Cl.$^6$ .................................................. G01P 9/04
[52] U.S. Cl. ...................................................... 73/504.12
[58] Field of Search .......................... 73/504.14, 504.12, 73/504.13, 504.15, 504.16; 310/316

[56] References Cited

U.S. PATENT DOCUMENTS

| 5,349,857 | 9/1994 | Kasanami et al. | 73/504.14 |
| 5,434,467 | 7/1995 | Abe et al. | 73/504.12 |
| 5,635,787 | 6/1997 | Mori et al. | 73/504.12 |

*Primary Examiner*—John E. Chapman
*Attorney, Agent, or Firm*—Ostrolenk, Faber, Gerb & Soffen, LLP

[57] ABSTRACT

A vibration gyroscope which is capable of accurately detecting a rotational angular velocity regardless of environmental changes or changes in vibrator characteristics includes a vibrator formed of a vibration element, and first and second piezoelectric elements for detection and a third piezoelectric element for driving. Output currents of the first and second piezoelectric elements are converted into voltages by I–V conversion circuits, or output voltages of the first and second piezoelectric elements are detected by voltage detection circuits, and then the voltages are added together by an adder circuit. An output signal of the adder circuit is monitored by a monitor circuit. On the basis of this result, the voltage or the phase of a drive signal fed from an oscillation circuit to the third piezoelectric element is controlled. The output signals of the I–V conversion circuits or the output signals of the voltage detection circuits are formed into a DC signal corresponding to a rotational angular velocity via a differential amplifier circuit, a synchronization detection circuit, a smoothing circuit, and an amplifier circuit.

12 Claims, 9 Drawing Sheets

5,902,931

VIBRATION GYROSCOPE

BACKGROUND OF THE INVENTION

1. Field of the Invention

The present invention relates to a vibration gyroscope and, more particularly, to a vibration gyroscope for detecting rotational angular velocity using, for example, mechanical vibration.

2. Description of the Related Art

FIG. 5 is a diagram illustrating an example of a conventional vibration gyroscope. A vibration gyroscope 1 comprises a vibrator formed of a vibration element 2 in the shape of, for example, a regular triangular prism, and piezoelectric elements 3a, 3b and 3c formed on the sides of the vibration element 2. The piezoelectric elements 3a and 3b are used for detection to detect a signal corresponding to a rotational angular velocity. The piezoelectric element 3c is used for driving to flexibly vibrate the vibration element 2.

The piezoelectric elements 3a and 3b are respectively connected to I–V conversion circuits 4a and 4b so that the output currents of the piezoelectric elements 3a and 3b are converted into voltages. The I–V conversion circuits 4a and 4b are connected to an adder circuit 5. The output signal of the adder circuit 5 is fed back to an oscillation circuit 6, causing the oscillation circuit 6 to provide a drive signal to the piezoelectric element 3c for driving. The oscillation circuit 6 comprises, for example, a phase circuit 6a and an amplifier circuit 6b, and adjusts the phase and voltage of a signal fed back from the adder circuit 5. Further, the I–V conversion circuits 4a and 4b are connected to a differential amplifier circuit 7, and the differential amplifier circuit 7 is connected to a synchronization detection circuit 8.

As a result of supplying a drive signal output from the oscillation circuit 6 to the piezoelectric element 3c, the vibration element 2 of the vibration gyroscope 1 flexibly vibrates in a direction intersecting at right angles to the surface on which the piezoelectric element 3c is formed. At this time, the flexed states of the piezoelectric elements 3a and 3b for detection are the same, and the same signal is output from the I–V conversion circuits 4a and 4b. Therefore, the output signal of the differential amplifier circuit 7 becomes "0", and it can be seen that no rotational angular velocity is applied. When a rotational angular velocity is applied to the vibration gyroscope 1, the flexing direction of the vibration element 2 varies due to a Coriolis force. For this reason, the flexed states of the piezoelectric elements 3a and 3b vary, causing one of the output currents from the piezoelectric elements 3a and 3b to increase and the other to decrease. Therefore, the output voltages of the I–V conversion circuits 4a and 4b vary, causing the differential amplifier circuit 7 to output a signal corresponding to a change in the outputs of the I–V conversion circuits 4a and 4b. By detecting this signal using the synchronization detection circuit 8, a signal corresponding to the rotational angular velocity can be obtained.

When a rotational angular velocity is applied to the vibration gyroscope 1, the output voltages of the I–V conversion circuits 4a and 4b are each increased or decreased. However, by synthesizing these signals with the adder circuit 5, the amounts of the change in the signals are cancelled, and a signal having an almost constant voltage can be obtained. Therefore, by adjusting the phase and voltage of the output signal of the adder circuit 5 by the oscillation circuit 6, it is possible to provide a stable drive signal to the vibrator.

FIG. 6 is a diagram illustrating another example of the conventional vibration gyroscope. A vibration gyroscope 1 comprises a vibrator formed of a vibration element 2 in the shape of, for example, a regular triangular prism and piezoelectric elements 3a, 3b and 3c formed on the sides of the vibration element 2. The piezoelectric elements 3a and 3b are used for detection to detect a signal corresponding to a rotational angular velocity. The piezoelectric element 3c is used for driving to flexibly vibrate the vibration element 2.

The piezoelectric elements 3a and 3b are connected to voltage detection circuits 104a and 104b, respectively, whereby the output voltages of the piezoelectric elements 3a and 3b are detected, respectively. At this time, in order to detect the output voltages of the piezoelectric elements 3a and 3b, resistors are connected between the input ends of the voltage detection circuits 104a and 104b and intermediate points of the power supply voltage. As the voltage detection circuits 104a and 104b, buffer circuits or the like are used. The voltage detection circuits 104a and 104b are connected to the adder circuit 5. Then, the output signal of the adder circuit 5 is fed back to the oscillation circuit 6, causing the oscillation circuit 6 to provide a drive signal to the piezoelectric element 3c for driving purposes. The oscillation circuit 6 comprises, for example, a phase circuit 6a and an amplifier circuit 6b, and adjusts the phase and voltage of a signal fed back from the adder circuit 5. Further, the voltage detection circuits 104a and 104b are connected to a differential amplifier circuit 7, and the differential amplifier circuit 7 is connected to a synchronization detection circuit 8.

As a result of supplying a drive signal output from the oscillation circuit 6 to the piezoelectric element 3c, the vibration element 2 of the vibration gyroscope 1 flexibly vibrates in a direction intersecting at right angles to the surface on which the piezoelectric element 3c is formed. At this time, the flexed states of the piezoelectric elements 3a and 3b for detection are the same, and the same signal is output from the voltage detection circuits 104a and 104b. Therefore, the output signal of the differential amplifier circuit 7 becomes "0", and it can be seen that no rotational angular velocity is applied. When a rotational angular velocity is applied to the vibration gyroscope 1, the flexing direction of the vibration element 2 varies due to a Coriolis force. For this reason, the flexed states of the piezoelectric elements 3a and 3b vary, causing one of the output voltages from the piezoelectric elements 3a and 3b to increase and the other to decrease. Therefore, the output voltages of the voltage detection circuits 104a and 104b vary, causing the differential amplifier circuit 7 to output a signal corresponding to a change in the outputs of the voltage detection circuits 104a and 104b. By detecting this signal using the synchronization detection circuit 8, a signal corresponding to the rotational angular velocity can be obtained.

When a rotational angular velocity is applied to the vibration gyroscope 1, the output voltages of the voltage detection circuits 104a and 104b are each increased or decreased. However, by synthesizing these signals by the adder circuit 5, the amounts of changes of the signals are cancelled, and a signal having an almost constant voltage can be obtained. Therefore, by adjusting the phase and voltage of the output signal of the adder circuit 5 by the oscillation circuit 6, it is possible to provide a stable drive signal to the vibrator.

However, even if the vibrator is flexibly vibrated with a stable drive signal, a signal output from the vibrator becomes unstable due to environmental changes such as atmospheric temperature, or changes in vibrator characteristics and therefore, it is not possible to accurately detect rotational angular velocity.

SUMMARY OF THE INVENTION

Accordingly, a primary object of the present invention is to provide a vibration gyroscope which is capable of accurately detecting a rotational angular velocity regardless of environmental changes or changes in vibrator characteristics.

To achieve the above-described and other objects. There is provided a vibration gyroscope comprising: a vibrator having a drive section for vibrating said vibrator and a plurality of detection sections for outputting electric signals corresponding to the vibration state of the vibrator; a plurality of detection circuits for detecting the electric signals and generating a plurality of detection signals; a synthesis circuit for synthesizing the detection signals into a synthesized signal; a monitoring circuit for monitoring the synthesized signal and for generating an adjusting signal as a function of the synthesized signal; and an oscillation circuit responsive to the adjusting signal and the synthesized signal for adjusting the magnitude or phase of an output signal of the oscillation circuit and providing the oscillation circuit output signal to the drive section.

According to a second aspect of the present invention, there is provided a vibration gyroscope comprising: a vibrator including a vibration element, a plurality of detection sections for outputting a plurality of electric currents corresponding to the vibration state of the vibration element, and a drive section for vibrating the vibration element; a plurality of I–V conversion circuits for converting each output current obtained from the plurality of detection sections into a plurality of voltages; an adder circuit for synthesizing said plurality of voltages into an adder output signal; a monitor circuit for monitoring the adder output signal and for generating an adjusting signal as a function of the adder output signal; and an oscillation circuit responsive to the adjusting signal and the adder output signal for adjusting the magnitude of an output signal of the oscillation circuit and providing the oscillation circuit output signal to the drive section.

In this vibration gyroscope, as a monitor circuit, a monitor circuit may be used which comprises a smoothing circuit for smoothing the adder output signal, a reference signal circuit for outputting a signal which serves as a reference, and a comparator circuit for comparing the output signal of the smoothing circuit with the output signal of the reference signal circuit and outputting the adjusting signal for adjusting the oscillation circuit output signal so that the magnitude of the adder output signal becomes constant.

Alternatively, as a monitor circuit, a monitor circuit may be used which comprises a smoothing circuit for smoothing the adder output signal, a reference signal circuit for outputting a reference signal corresponding to temperature, and a comparator circuit for comparing the output signal of the smoothing circuit with the output signal of the reference signal circuit and outputting the adjusting signal for adjusting the magnitude of the oscillation circuit output signal so that the magnitude of the adder output signal is dependent on temperature.

The voltage of the output signal of the oscillation circuit is controlled so that the output signal of the adder circuit becomes a fixed voltage or a voltage corresponding to temperature. As a result, a stable output signal can be obtained from the vibrator, and thus it is possible to accurately detect a rotational angular velocity.

According to a third aspect of the present invention, there is provided a vibration gyroscope comprising: a vibrator including a vibration element, a plurality of detection sections for outputting a plurality of electric currents corresponding to the vibration state of the vibration element, and a drive section for vibrating the vibration element; a plurality of I–V conversion circuits for converting each output current obtained from the plurality of detection sections into a plurality of voltages; an adder circuit for synthesizing the plurality of voltages into an adder output signal; a monitor circuit for monitoring the adder output signal and for generating an adjusting signal as a function of the adder output signal; and an oscillation circuit responsive to the adjusting signal and the adder output signal for adjusting the phase of the oscillation circuit output signal and providing the oscillation circuit output signal to the drive section.

In this vibration gyroscope, as a monitor circuit, a monitor circuit may be used which comprises a smoothing circuit for smoothing the adder output signal, a reference signal circuit for outputting a signal which serves as a reference, and a comparator circuit for comparing the output signal of the smoothing circuit with the output signal of the reference signal circuit and outputting the adjusting signal for adjusting the phase of the oscillation circuit output signal so that the magnitude of the adder output signal becomes constant.

Alternatively, as a monitor circuit, a monitor circuit may be used which comprises a smoothing circuit for smoothing the adder output signal, a reference signal circuit for outputting a reference signal corresponding to temperature, and a comparator circuit for comparing the output signal of the smoothing circuit with the output signal of the reference signal circuit and outputting the adjusting signal for adjusting the oscillation circuit output signal so that the magnitude of adder output signal is dependent on temperature.

The phase of the output signal of the oscillation circuit is controlled so that the output signal of the adder circuit becomes a fixed voltage or a voltage corresponding to temperature. As a result, a stable output signal can be obtained from the vibrator, and thus it is possible to accurately detect a rotational angular velocity.

According to a fourth aspect of the present invention, there is provided a vibration gyroscope comprising: a vibrator including a vibration element, a plurality of detection sections for outputting a plurality of electric currents corresponding to the vibration state of the vibration element, and a drive section for vibrating the vibration element; a plurality of voltage detection circuits for generating a plurality of detection voltages; an adder circuit for synthesizing the plurality of detection voltages into an adder output signal; a monitor circuit for monitoring the adder output signal and for generating an adjusting signal as a function of the adder output signal; and an oscillation circuit responsive to the adjusting signal and the adder output signal for adjusting the voltage or phase of an output signal of the oscillation circuit and providing the oscillation circuit output signal to the drive section.

In this vibration gyroscope, as a monitor circuit, a monitor circuit may be used which comprises a smoothing circuit for smoothing the adder output signal, a reference signal circuit for outputting a signal which serves as a reference, and a comparator circuit for comparing the output signal of the smoothing circuit with the output signal of the reference signal circuit and outputting the adjusting signal for adjusting the phase of the oscillation circuit output signal so that the magnitude of the adder output signal of the adder circuit becomes constant.

Alternatively, as a monitor circuit, a monitor circuit may be used which comprises a smoothing circuit for smoothing the adder output signal, a reference signal circuit for outputting a reference signal corresponding to temperature, and a comparator circuit for comparing the output signal of the smoothing circuit with the output signal of the reference signal circuit and outputting the adjusting signal for adjusting the phase of the oscillation circuit output signal so that the adder output signal is dependent on temperature.

The phase of the output signal of the oscillation circuit is controlled so that the output signal of the adder circuit becomes a fixed voltage or a voltage corresponding to temperature. As a result, a stable output signal can be obtained from the vibrator, and thus it is possible to accurately detect a rotational angular velocity.

According to the present invention, it is possible to obtain a signal accurately corresponding to a rotational angular velocity. Therefore, it is always possible to detect a rotational angular velocity with accuracy.

The above and further objects, aspects and novel features of the invention will become more apparent from the following detailed description when read in connection with the accompanying drawings.

DESCRIPTION OF THE PREFERRED EMBODIMENTS

Figure 1:
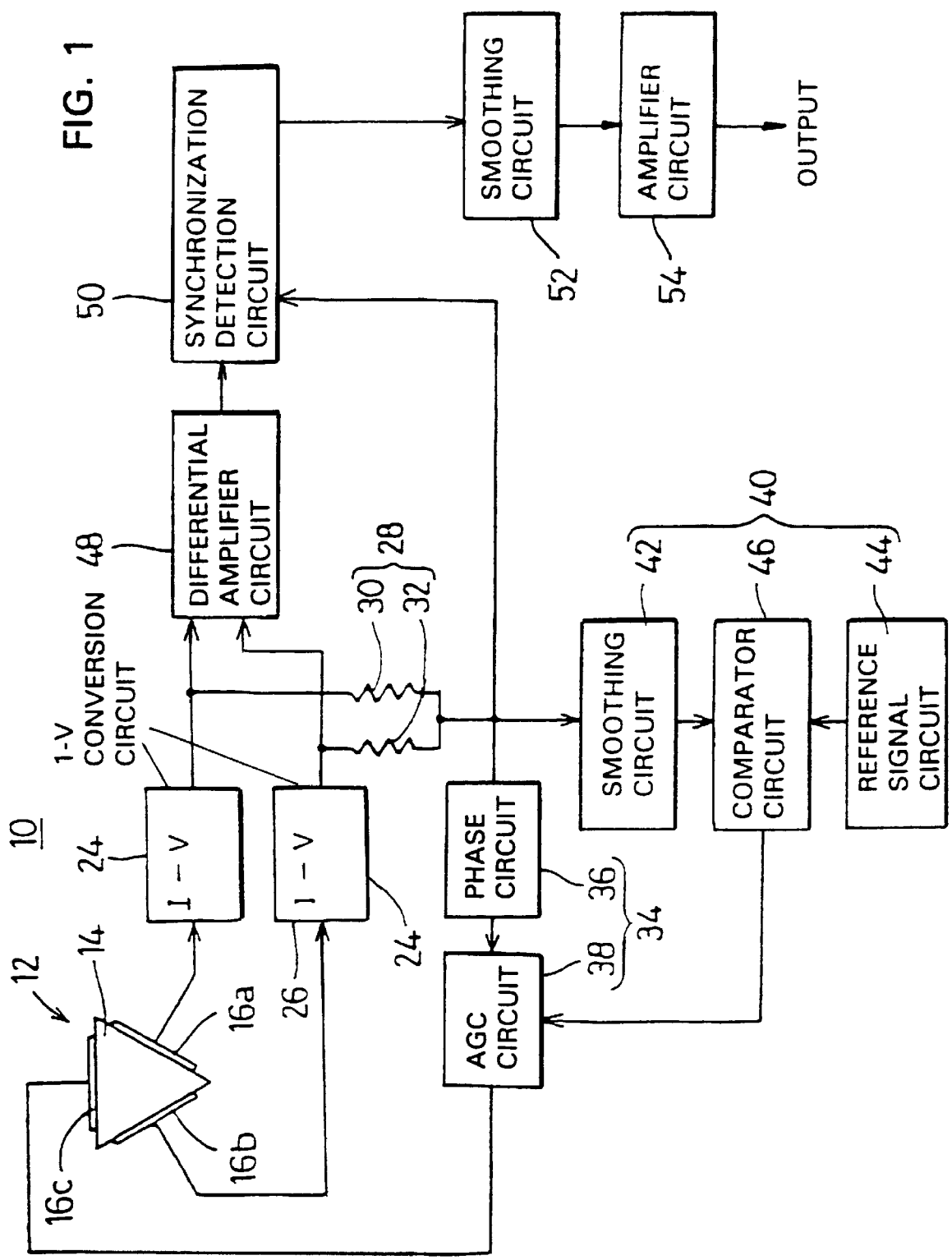
FIG. 1 is a diagram illustrating a first embodiment of a vibration gyroscope according to the present invention.
Figure 2:
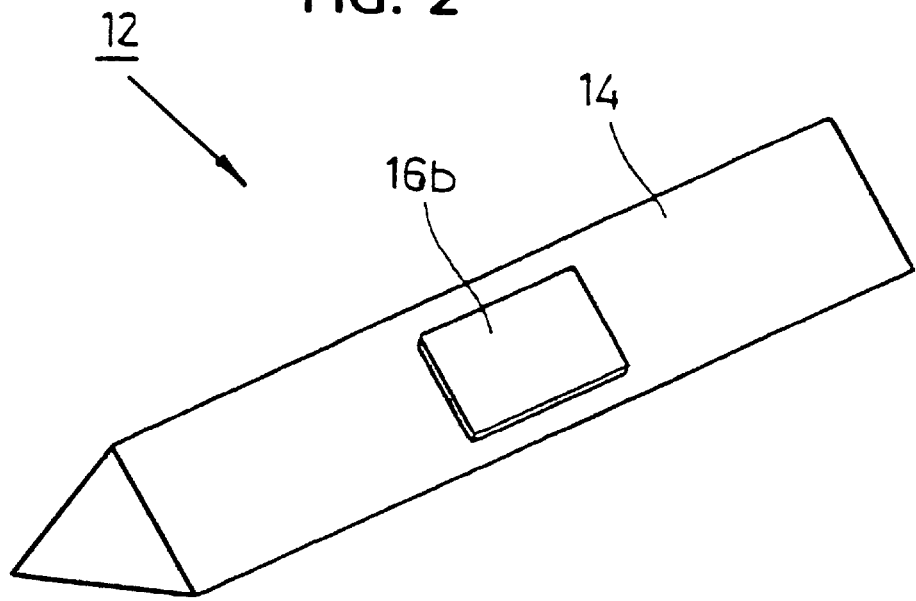
FIG. 2 is a perspective view of a vibrator used in the vibration gyroscope shown in FIG. 1.

FIG. 1 is a diagram illustrating a first embodiment of a vibration gyroscope according to the present invention. A vibration gyroscope 10 comprises a vibrator 12. The vibrator 12, as shown in FIG. 2, comprises a vibration element 14 in the shape of, for example, a regular triangular prism. The vibration element 14 is generally formed from a material which mechanically vibrates, such as elinver, iron-nickle alloy, quartz, glass, crystal, or ceramic.

Figure 3:
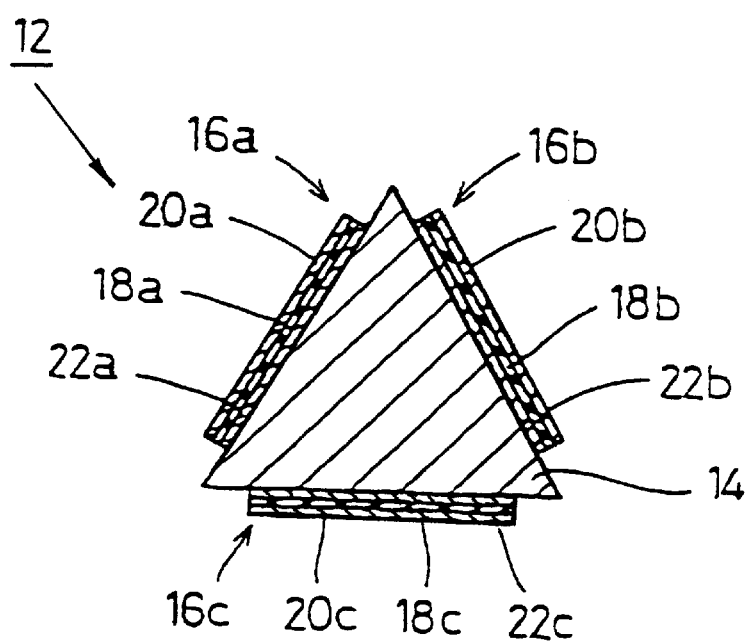
FIG. 3 is a sectional view of the vibrator shown in FIG. 2.

The three sides of the vibration element 14, as shown in FIG. 3, are formed with piezoelectric elements 16a, 16b and 16c. The piezoelectric element 16a comprises a piezoelectric layer 18a formed from, for example, piezoelectric ceramic. Both sides of this piezoelectric layer 18a are formed with electrodes 20a and 22a, with one electrode 22a being bonded to the vibration element 14. In a similar manner, the piezoelectric elements 16b and 16c comprise piezoelectric layers 18b and 18c, respectively. Both sides of the piezoelectric layers 18b and 18c are formed with electrodes 20b and 22b, and electrodes 20c and 22c, respectively, with one electrode 22b and one electrode 22c being bonded to the vibration element 14. In this vibrator 12, for example, the piezoelectric elements 16a and 16b are used as detection sections for detecting a signal corresponding to a rotational angular velocity. The piezoelectric element 16c is used as a drive section for flexibly vibrating the vibration element 14.

I–V conversion circuits 24 and 26 are respectively connected to the piezoelectric elements 16a and 16b. In these I–V conversion circuits 24 and 26, electric currents output from the piezoelectric elements 16a and 16b are converted into voltages. Since the input impedances of the I–V conversion circuits 24 and 26 are "0", even if the impedances of the piezoelectric elements 16a and 16b for detection vary, no adverse influence is exerted upon the output signals of the I–V conversion circuits 24 and 26.

The two I–V conversion circuits 24 and 26 are connected to a synthesis circuit, such as an adder circuit 28. In the adder circuit 28, the output signals of the I–V conversion circuits 24 and 26 are synthesized. Here, the output ends of the I–V conversion circuits 24 and 26 are connected via two resistors 30 and 32, and the output signals of the I–V conversion circuits 24 and 26 are synthesized. The output signal of the adder circuit 28 is input to an oscillation circuit 134. The oscillation circuit 134 comprises a phase circuit 36 and an automatic gain control circuit (AGC circuit) 38. In the phase circuit 36, the phase of the output signal of the adder circuit 28 is adjusted, and in the AGC circuit 38, the voltage level is adjusted. Then, the output signal of the oscillation circuit 134 is fed as a drive signal to the piezoelectric element 16c.

Further, the output signal of the adder circuit 28 is input to a monitor circuit 40. The monitor circuit 40 comprises a smoothing circuit 42 whereby the output signal of the adder circuit 28 is smoothed. Furthermore, the monitor circuit 40 comprises a reference signal circuit 44. The reference signal circuit 44 outputs a fixed-level signal. The smoothing circuit 42 and the reference signal circuit 44 are connected to a comparator circuit 46. In the comparator circuit 46, the output signal voltage of the smoothing circuit 42 is compared with the output signal voltage of the reference signal circuit 44. According to the comparison result, a voltage control signal for adjusting the voltage of the output signal of the AGC circuit 38 is output. In the AGC circuit 38, the voltage of the drive signal is adjusted in accordance with the voltage control signal from the comparator circuit 46 so that the output signal voltage of the adder circuit 28 becomes constant.

Further, the I–V conversion circuits 24 and 26 are connected to a differential amplifier circuit 48 whereby a difference between the output signals of the I–V conversion circuits 24 and 26 is detected. The output signal of the differential amplifier circuit 48 is detected-in synchronization with the signal of the adder circuit 28 by a synchronization detection circuit 50. The signal detected by the synchronization detection circuit 50 is smoothed by a smoothing circuit 52 and further amplified by an amplifier circuit 54.

In this vibration gyroscope 10, as a result of supplying a drive signal from the oscillation circuit 34 to the piezoelectric element 16c, the vibration element 14 flexibly vibrates in a direction intersecting at right angles to the surface on which the piezoelectric element 16c is formed. At this time, the flexed states of the piezoelectric elements 16a and 16b for detection are the same, and the same signal is output from these piezoelectric elements 16a and 16b. The output currents of the piezoelectric elements 16a and 16b are converted into voltages by the I–V conversion circuits 24 and 26. The converted-into-voltage signals are added together by the adder circuit 28, with the voltage and the phase being adjusted by the oscillation circuit 34, and this signal is fed as a drive signal to the piezoelectric element 16c. In this way, the vibrator 12 is self-excited.

While not in rotation, since the output signals of the piezoelectric elements 16a and 16b are the same, the output signal of the differential amplifier circuit 48 is "0". Therefore, it can be seen that no rotational angular velocity is applied to the vibration gyroscope 10. When the vibration gyroscope 10 rotates about the axis of the vibration element 14, the vibration direction of the vibration element 14 varies due to a Coriolis force. For this reason, the flexed states of the piezoelectric elements 16a and 16b vary, causing output signals from the piezoelectric elements 16a and 16b to vary. At this time, one flexing of the piezoelectric elements 16a and 16b is large, and the other flexing is small. Therefore, one of the output currents of the piezoelectric elements 16a and 16b is large, and the other output current is small. These output currents are converted into voltages by the I–V conversion circuits 24 and 26, and a signal corresponding to the difference between the voltages is output from the differential amplifier circuit 48. That is, a signal corresponding to the amount of the change in the output signals of the piezoelectric elements 16a and 16b is output from the differential amplifier circuit 48.

The output signal of the differential amplifier circuit 48 is detected in synchronization with the signal of the adder circuit 28 by the synchronization detection circuit 50. As a result, only a positive component or a negative component of the output signal of the differential amplifier circuit 48 is detected. The output signal of the synchronization detection circuit 50 is smoothed by the smoothing circuit 52 and further amplified by the amplifier circuit 54. Therefore, the output signal of the amplifier circuit 54 is a signal corresponding to the rotational angular velocity applied to the vibration gyroscope 10. By measuring this signal, the rotational angular velocity can be detected.

In this vibration gyroscope 10, the greater the rotational angular velocity, the greater the difference between the output signals of the piezoelectric elements 16a and 16b becomes, and the signal level obtained from the differential amplifier circuit 48 is increased. For this reason, the level of the DC signal output from the amplifier circuit 54 increases. In this way, the level of the output signal of the amplifier circuit 54 varies according to the rotational angular velocity applied to the vibration gyroscope 10. Therefore, by measuring the level of the output signal of the amplifier circuit 54, the magnitude of the rotational angular velocity can be known. Further, if the direction in which the rotational angular velocity is applied varies, the signals output from the piezoelectric elements 16a and 16b vary reversely. For this reason, the polarities of the signals detected by the synchronization detection circuit 50 are reversed, and the polarity of the signal obtained from the amplifier circuit 54 is also reversed. Therefore, by measuring the polarity of the signal output from the amplifier circuit 54, the direction of the rotational angular velocity can be known.

When a rotational angular velocity is applied to the vibration gyroscope 10, one of the output signals of the piezoelectric elements 16a and 16b is increased, and the other output signal is decreased. Therefore, if the output signals of the I–V conversion circuits 24 and 26 are synthesized by the adder circuit 28, the amounts of the changes in the output signals of the piezoelectric elements 16a and 16b are cancelled, and thus an almost fixed signal can be obtained. Therefore, if the phase and the voltage of the output signal from the adder circuit 28 are adjusted and formed into a drive signal, it is possible to cause the vibration element 14 to flexibly vibrate stably.

However, even if the vibration element 14 is flexibly vibrated with a drive signal having a fixed voltage, there are cases where the signal output from the vibrator 12 becomes unstable due to environmental changes or changes in the characteristics of the vibrator 12. For comparison, in this vibration gyroscope 10, the output signal of the adder circuit 28 is compared with the output signal of the reference signal circuit 44 by the comparator circuit 46, and the voltage of the drive signal output from the AGC circuit 38 is controlled so that the output signal voltage of the adder circuit 28 is always constant. For this reason, it is possible to obtain a stable output signal from the piezoelectric elements 16a and 16b for detection regardless of changes in characteristics of the vibrator 12. Therefore, it is possible to obtain a signal accurately corresponding to a rotational angular velocity from the piezoelectric elements 16a and 16b for detection. In response to this, the output signal of the amplifier circuit 54 also becomes a signal accurately corresponding to the rotational angular velocity. Therefore, measurement of the output signal of the amplifier circuit 54 makes it possible to accurately detect the rotational angular velocity applied to the vibration gyroscope 10.

Figure 4:
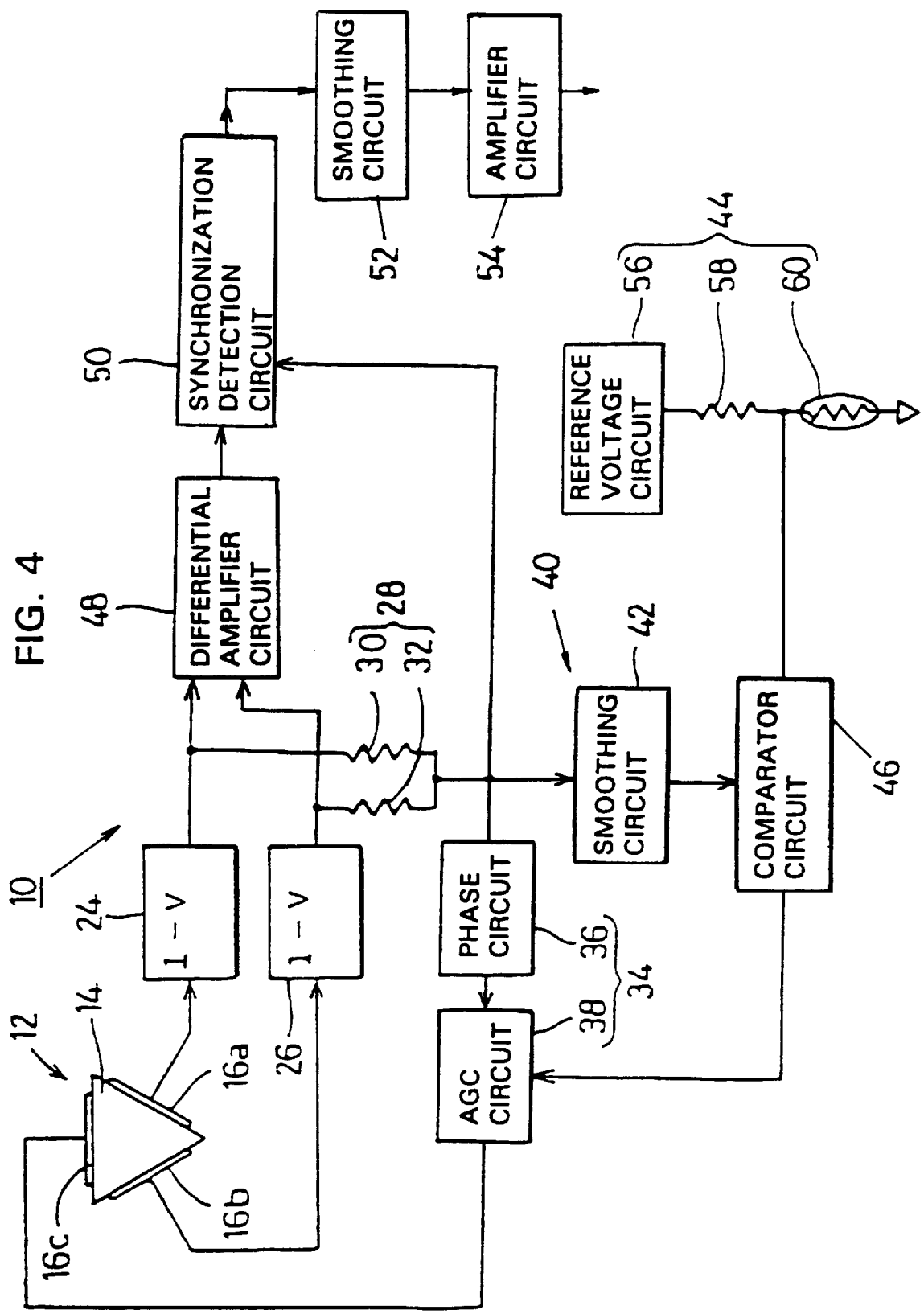
FIG. 4 is a diagram illustrating a second embodiment of the vibration gyroscope according to the present invention.
Figure 5:
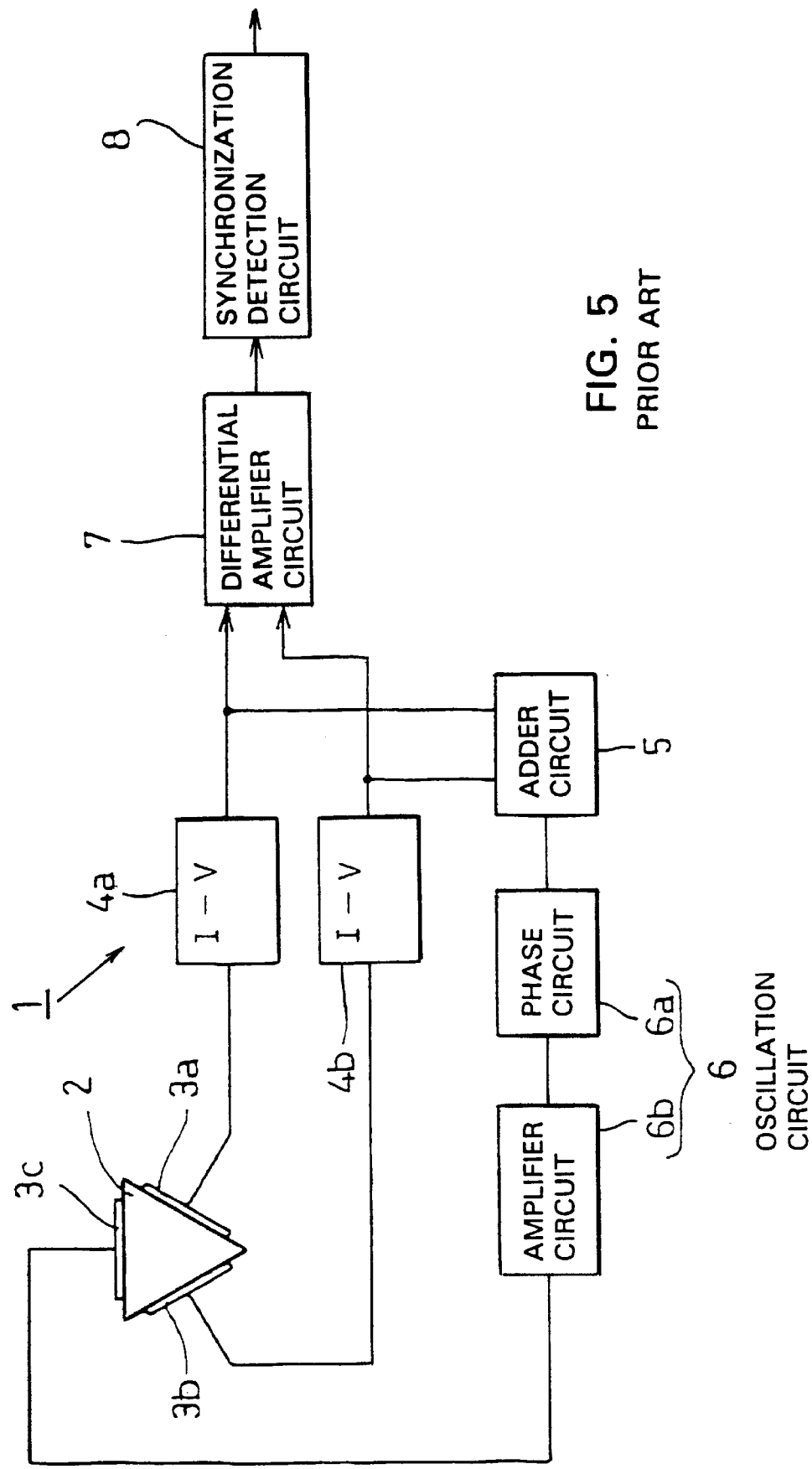
FIG. 5 is a diagram illustrating an example of a conventional vibration gyroscope.
Figure 6:
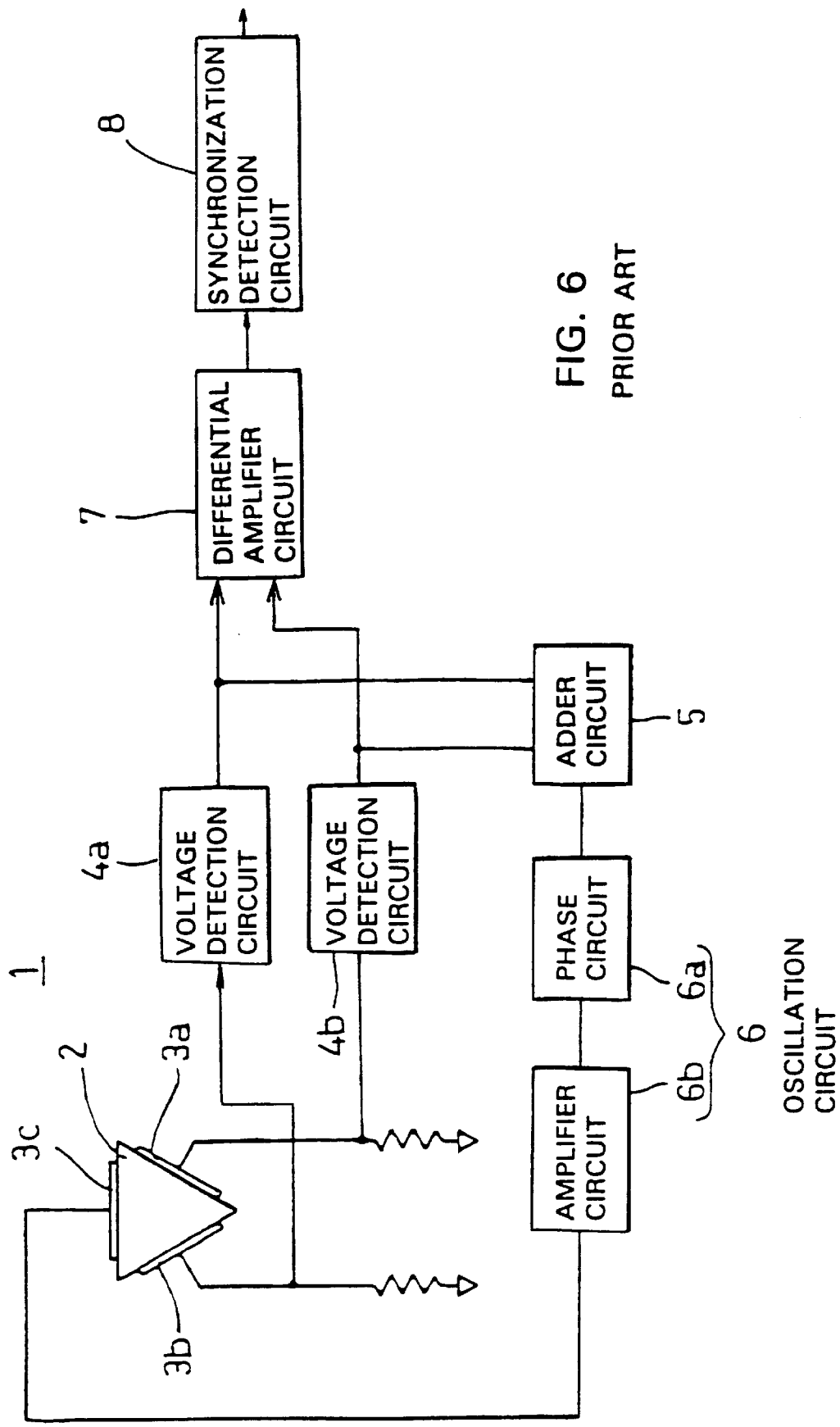
FIG. 6 is a diagram illustrating another example of the conventional vibration gyroscope.

FIG. 4 is a diagram illustrating a second embodiment of the vibration gyroscope of the present invention. As the reference signal circuit 44, a reference signal circuit which outputs a reference signal corresponding to changes in atmospheric temperature may be used. In this vibration gyroscope 10, a reference voltage circuit 56, a resistor 58 and a temperature-sensing element 60 form the reference signal circuit 44. As the temperature-sensing element 60, an element whose resistance value varies due to temperature, such as a thermistor or posistor, or an element whose voltage varies due to temperature, such as a diode, may be used. Here, the resistor 58 and the thermistor serving as the temperature-sensing element 60 form a voltage-dividing circuit, and this voltage-dividing circuit divides the output signal of the reference voltage circuit 56. Therefore, the output signal of the reference signal circuit 44 becomes a voltage corresponding to changes in atmospheric temperature.

The output signal of the adder circuit 28 is compared with a reference signal corresponding to changes in atmospheric temperature by the comparator circuit 46. Then, the voltage of the signal output from the AGC circuit 38 is adjusted so that the output signal voltage of the adder circuit 28 becomes a value corresponding to the reference signal voltage. That is, the flexing and vibration of the vibration element 14 is controlled so that the output signal voltage of the adder circuit 28 becomes a value corresponding to changes in atmospheric temperature. Therefore, it follows that the signal corresponding to the rotational angular velocity obtained from the piezoelectric elements 16a and 16b corresponds to changes in atmospheric temperature. For this reason, the signal obtained from the amplifier circuit 54 also corresponds to changes in atmospheric temperature. Therefore, measurement of this signal makes it possible to accurately detect the rotational angular velocity regardless of changes in atmospheric temperature.

Figure 7:
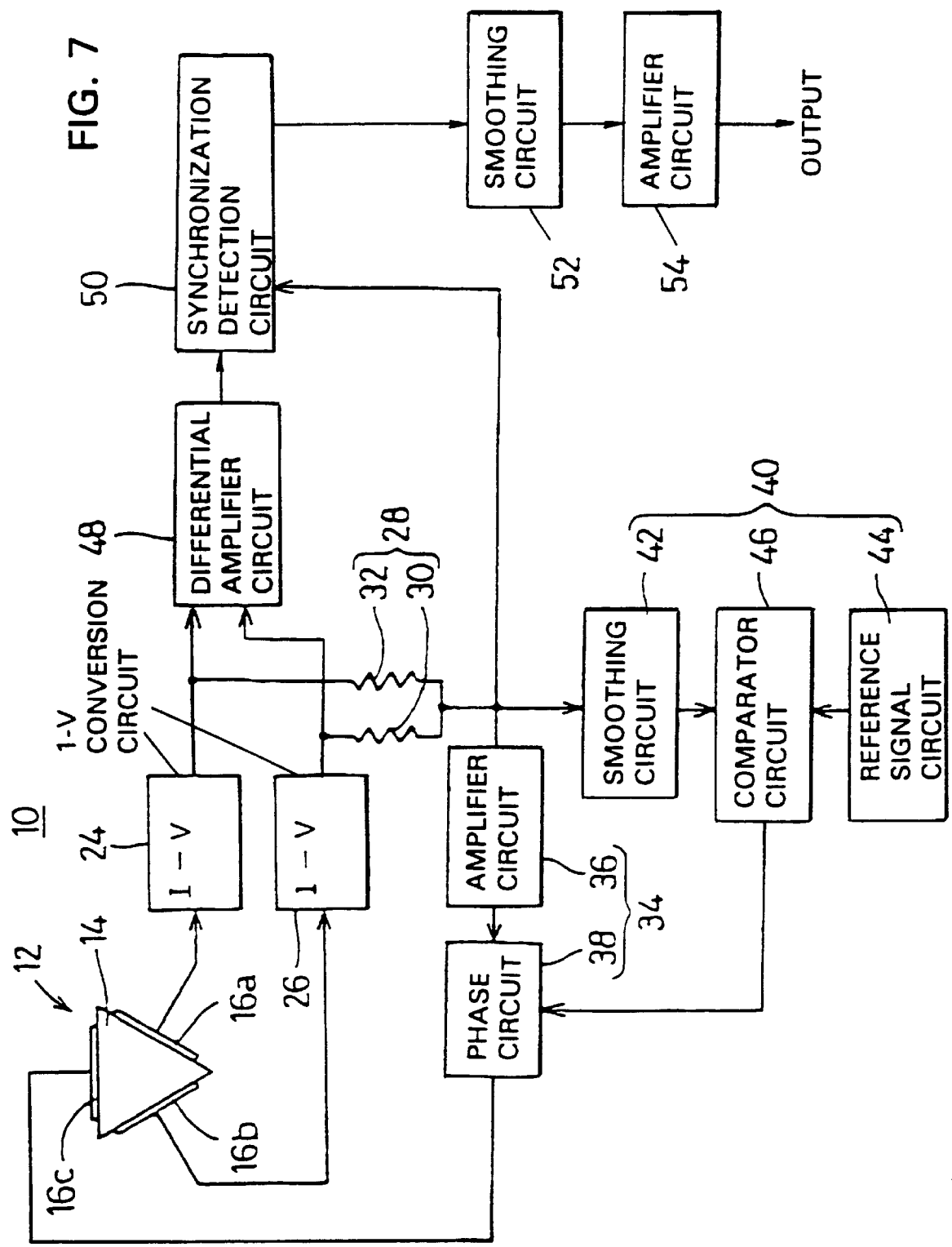
FIG. 7 is a diagram illustrating a third embodiment of the vibration gyroscope according to the present invention.

FIG. 7 is a diagram illustrating a third embodiment of the vibration gyroscope according to the present invention. A vibration gyroscope 10 comprises a vibrator 12. The vibrator 12, as shown in FIG. 2, comprises a vibration element 14 in the shape of, for example, a regular triangular prism. The vibration element 14 is generally formed from a material which mechanically vibrates, such as elinver, iron-nickle alloy, quartz, glass, crystal, or ceramic.

The three sides of the vibration element 14, as shown in FIG. 3, are formed with piezoelectric elements 16a, 16b and 16c. The piezoelectric element 16a comprises a piezoelectric layer 18a formed from, for example, piezoelectric ceramic. Both sides of this piezoelectric layer 18a are formed with electrodes 20a and 22a, with one electrode 22a being bonded to the vibration element 14. In a similar manner, the piezoelectric elements 16b and 16c comprise piezoelectric layers 18b and 18c, respectively. Both sides of the piezoelectric layers 18b and 18c are formed with electrodes 20b and 22b, and electrodes 20c and 22c, respectively, with one electrode 22b and one electrode 22c being bonded to the vibration element 14. In this vibrator 12, for example, the piezoelectric elements 16a and 16b are used as detection sections for detecting a signal corresponding to a rotational angular velocity. The piezoelectric element 16c is used as a drive section for flexibly vibrating the vibration element 14.

I–V conversion circuits 24 and 26 are respectively connected to the piezoelectric elements 16a and 16b. In these I–V conversion circuits 24 and 26, electric currents output from the piezoelectric elements 16a and 16b are converted into voltages. Since the input impedances of the I–V conversion circuits 24 and 26 are "0", even if the impedances of the piezoelectric elements 16a and 16b for detection vary, no adverse influence is exerted upon the output signals of the I–V conversion circuits 24 and 26.

The two I–V conversion circuits 24 and 26 are connected to an adder circuit 28. In the adder circuit 28, the output signals of the I–V conversion circuits 24 and 26 are synthesized. Here, the output ends of the I–V conversion circuits 24 and 26 are connected via two resistors 30 and 32, and the output signals of the I–V conversion circuits 24 and 26 are synthesized. The output signal of the adder circuit 28 is input to an oscillation circuit 134. The oscillation circuit 134 comprises an amplifier circuit 136 and a phase control circuit 138. In the amplifier circuit 136, the voltage level of the output signal of the adder circuit 28 is adjusted, and in the phase control circuit 138, the phase is adjusted. Then, the output signal of the oscillation circuit 134 is fed as a drive signal to the piezoelectric element 16c.

Further, the output signal of the adder circuit 28 is input to a monitor circuit 40. The monitor circuit 40 comprises a smoothing circuit 42 whereby the output signal of the adder circuit 28 is smoothed. Further, the monitor circuit 40 comprises a reference signal circuit 44. The reference signal circuit 44 outputs a fixed-level signal. The smoothing circuit 42 and the reference signal circuit 44 are connected to a comparator circuit 46. In the comparator circuit 46, the output signal voltage of the smoothing circuit 42 is compared with the output signal voltage of the reference signal circuit 44. According to the comparison result, a phase control signal for adjusting the phase of the output signal of the phase control circuit 138 is output. In the phase control circuit 138, the phase of the drive signal is adjusted in accordance with the phase control signal from the comparator circuit 46 so that the output signal voltage of the adder circuit 28 becomes constant.

Further, the I–V conversion circuits 24 and 26 are connected to a differential amplifier circuit 48 whereby a difference between the output signals of the I–V conversion circuits 24 and 26 is detected. The output signal of the differential amplifier circuit 48 is detected in synchronization with the signal of the adder circuit 28 by a synchronization detection circuit 50. The signal detected by the synchronization detection circuit 50 is smoothed by a smoothing circuit 52 and further amplified by an amplifier circuit 54.

In this vibration gyroscope 10, as a result of supplying a drive signal from the oscillation circuit 134 to the piezoelectric element 16c, the vibration element 14 flexibly vibrates in a direction intersecting at right angles to the surface on which the piezoelectric element 16c is formed. At this time, the flexed states of the piezoelectric elements 16a and 16b for detection are the same, and the same signal is output from these piezoelectric elements 16a and 16b. The output currents of the piezoelectric elements 16a and 16b are converted into voltages by the I–V conversion circuits 24 and 26. The converted-into-voltage signals are added together by the adder circuit 28, with the voltage and the phase being adjusted by the oscillation circuit 134, and this signal is fed as a drive signal to the piezoelectric element 16c. In this way, the vibrator 12 is self-excited.

While not in rotation, since the output signals of the piezoelectric elements 16a and 16b are the same, the output signal of the differential amplifier circuit 48 is "0". Therefore, it can be seen that no rotational angular velocity is applied to the vibration gyroscope 10. When the vibration gyroscope 10 rotates about the axis of the vibration element 14, the vibration direction of the vibration element 14 varies due to a Coriolis force. For this reason, the flexed states of the piezoelectric elements 16a and 16b vary, causing output signals from the piezoelectric elements 16a and 16b to vary. At this time, one of the flexings of the piezoelectric elements 16a and 16b is large, and the other flexing is small. Therefore, one of the output currents of the piezoelectric elements 16a and 16b is large, and the other output current is small. These output currents are converted into voltages by the I–V conversion circuits 24 and 26, and a signal corresponding to the difference between the voltages is output from the differential amplifier circuit 48. That is, a signal corresponding to the amount of the change in the output signals of the piezoelectric elements 16a and 16b is output from the differential amplifier circuit 48.

The output signal of the differential amplifier circuit 48 is detected in synchronization with the signal of the adder circuit 28 by the synchronization detection circuit 50. As a result, only a positive component or a negative component of the output signal of the differential amplifier circuit 48 is detected. The output signal of the synchronization detection circuit 50 is smoothed by the smoothing circuit 52 and further amplified by the amplifier circuit 54. Therefore, the output signal of the amplifier circuit 54 is a signal corresponding to the rotational angular velocity applied to the vibration gyroscope 10. By measuring this signal, the rotational angular velocity can be detected.

In this vibration gyroscope 10, the greater the rotational angular velocity, the greater the difference between the output signals of the piezoelectric elements 16a and 16b becomes, and the level of a signal obtained from the differential amplifier circuit 48 is increased. For this reason, the level of the DC signal output from the amplifier circuit 54 increases. In this way, the level of the output signal of the amplifier circuit 54 varies according to the rotational angular velocity applied to the vibration gyroscope 10. Therefore, by measuring the level of the output signal of the amplifier circuit 54, the magnitude of the rotational angular velocity can be known. Further, if the direction in which the rotational angular velocity is applied varies, the signals output from the piezoelectric elements 16a and 16b vary reversely. For this reason, the polarities of the signals detected by the synchronization detection circuit 50 are reversed, and the polarity of the signals obtained from the amplifier circuit 54 is also reversed. Therefore, by measuring the polarity of the signal output from the amplifier circuit 54, the direction of the rotational angular velocity can be known.

When a rotational angular velocity is applied to the vibration gyroscope 10, one of the output signals of the piezoelectric elements 16a and 16b is increased, and the other output signal is decreased. Therefore, if the output signals of the I–V conversion circuits 24 and 26 are synthesized by the adder circuit 28, the amounts of the changes of the output signals of the piezoelectric elements 16a and 16b are cancelled, and thus an almost fixed signal can be obtained. Therefore, if the phase and the voltage of the output signal from the adder circuit 28 are adjusted and formed into a drive signal, it is possible to cause the vibration element 14 to flexibly vibrate stably.

However, even if the vibration element 14 is flexibly vibrated with a drive signal having a fixed voltage, there are cases where the signal output from the vibrator 12 becomes unstable due to environmental changes or changes in the characteristics of the vibrator 12. For comparison, in this vibration gyroscope 10, the output signal of the adder circuit 28 is compared with the output signal of the reference signal circuit 44 by the comparator circuit 46, and the phase of the drive signal output from the phase control circuit 138 is controlled so that the output signal voltage of the adder circuit 28 is always constant. For this reason, it is possible to obtain a stable output signal from the piezoelectric elements 16a and 16b for detection regardless of changes in the characteristics of the vibrator 12. Therefore, it is possible to obtain a signal accurately corresponding to a rotational angular velocity from the piezoelectric elements 16a and 16b for detection. In response to this, the output signal of the amplifier circuit 54 also becomes a signal accurately corresponding to a rotational angular velocity. Therefore, measurement of the output signal of the amplifier circuit 54 makes it possible to accurately detect the rotational angular velocity applied to the vibration gyroscope 10.

Figure 8:
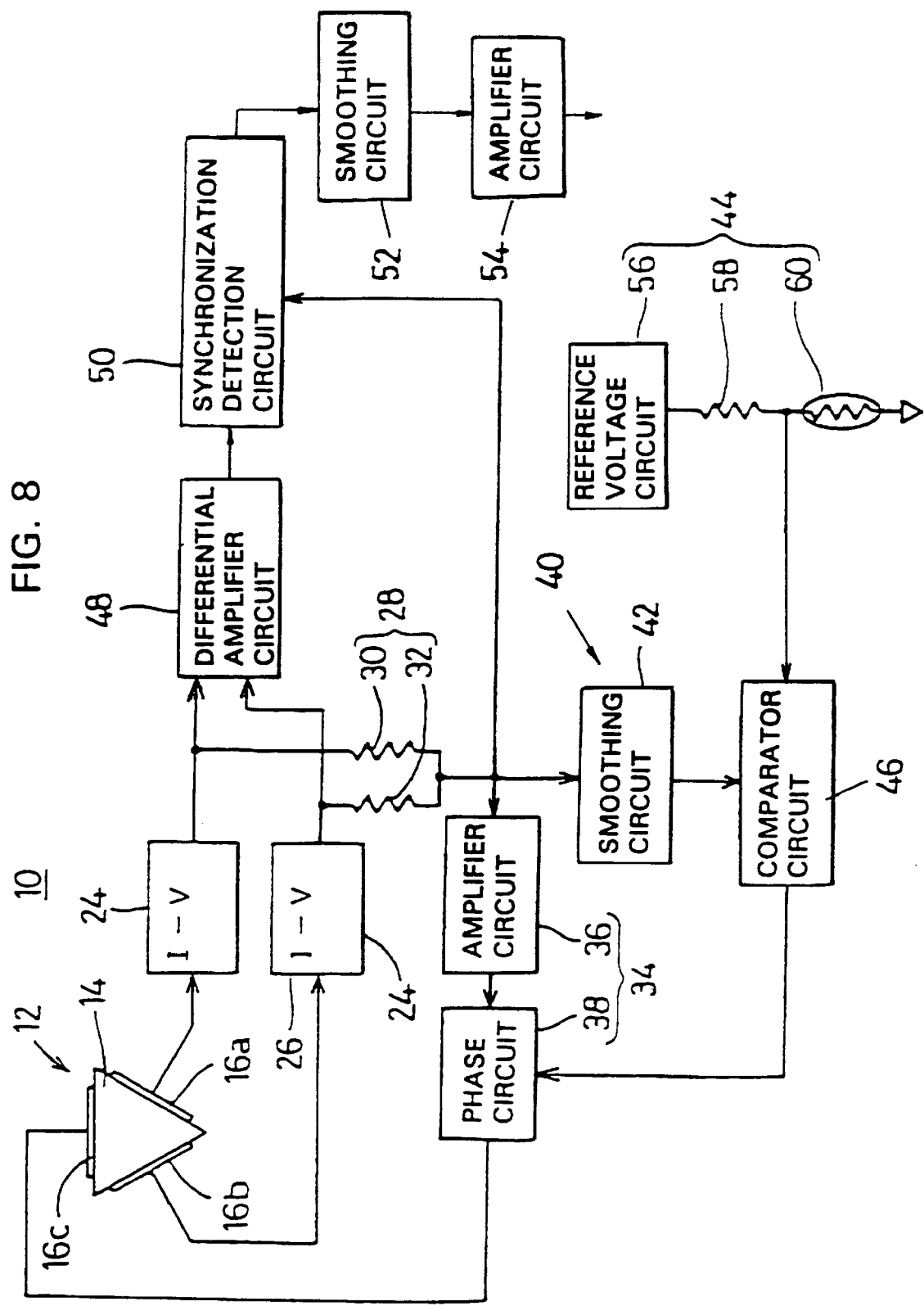
FIG. 8 is a diagram illustrating a fourth embodiment of the vibration gyroscope according to the present invention.

FIG. 8 is a diagram illustrating a fourth embodiment of the vibration gyroscope of the present invention. As a reference signal circuit 44, a reference signal circuit which outputs a reference signal corresponding to changes in atmospheric temperature may be used. In this vibration gyroscope 10, a reference voltage circuit 56, a resistor 58 and a temperature-sensing element 60 form a reference signal circuit 44. As the temperature-sensing element 60, an element whose resistance value varies due to temperature, such as a thermistor or posistor, or an element whose voltage varies due to temperature, such as a diode, is used. Here, the resistor 58 and the thermistor serving as the temperature-sensing element 60 form a voltage-dividing circuit, and this voltage-dividing circuit divides the output signal of the reference voltage circuit 56. Therefore, the output signal of the reference signal circuit 44 becomes a voltage corresponding to changes in atmospheric temperature.

The output signal of the adder circuit 28 is compared with a reference signal corresponding to changes in atmospheric temperature by the comparator circuit 46. Then, the phase of the signal output from the phase control circuit 138 is adjusted so that the output signal voltage of the adder circuit 28 becomes a value corresponding to the reference signal voltage. That is, the flexing and vibration of the vibration element 14 is controlled so that the output signal voltage of the adder circuit 28 becomes a value corresponding to changes in atmospheric temperature. Therefore, it follows that the signal corresponding to the rotational angular velocity obtained from the piezoelectric elements 16a and 16b corresponds to changes in atmospheric temperature. For this reason, the signal obtained from the amplifier circuit 54 also corresponds to changes in atmospheric temperature. Therefore, measurement of this signal makes it possible to accurately detect the rotational angular velocity regardless of changes in atmospheric temperature.

Figure 9:
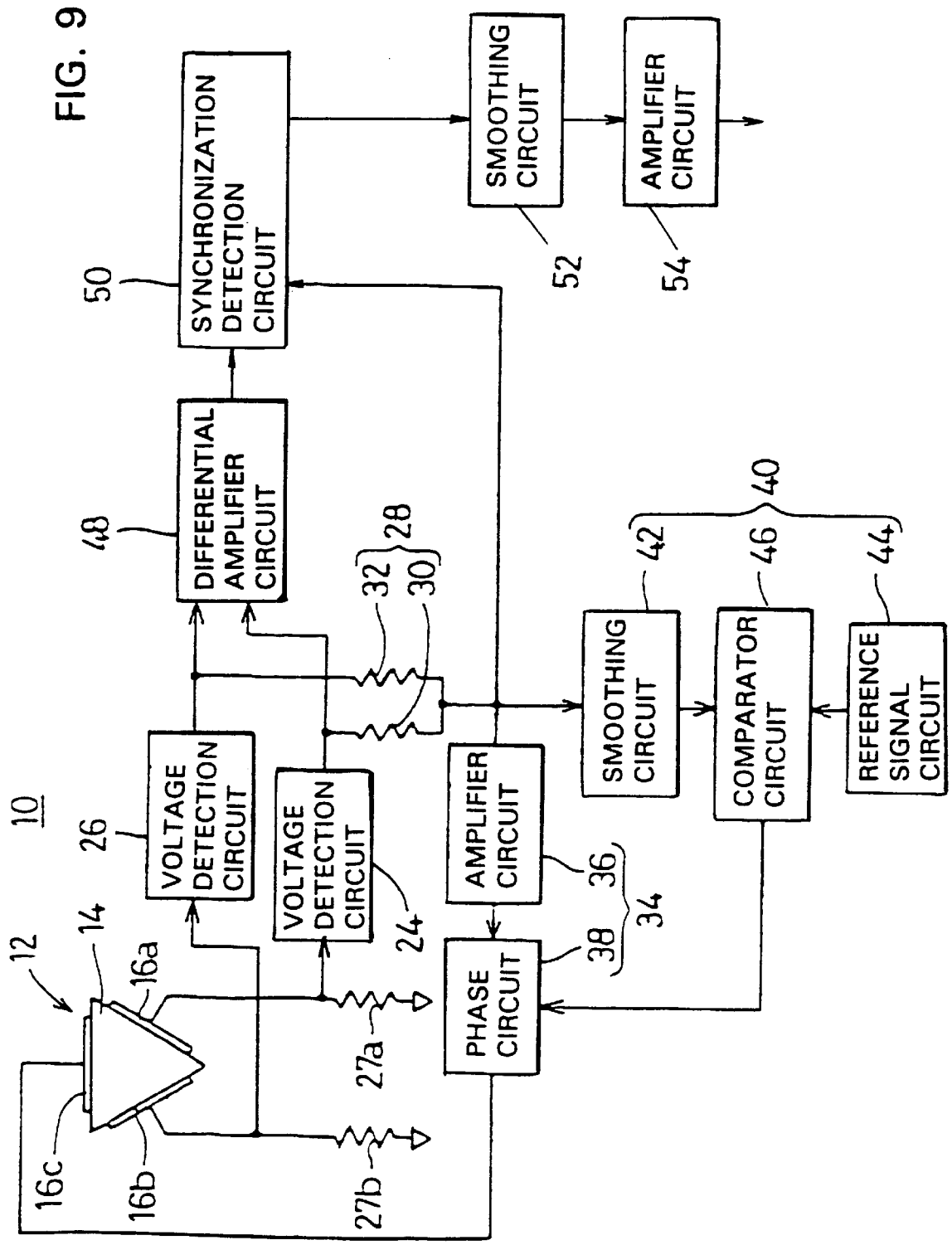
FIG. 9 is a diagram illustrating a fifth embodiment of the vibration gyroscope according to the present invention.

FIG. 9 is a diagram illustrating a fifth embodiment of the vibration gyroscope according to the present invention. A vibration gyroscope 10 comprises a vibrator 12. The vibrator 12, as shown in FIG. 2, comprises a vibration element 14 in the shape of, for example, a regular triangular prism. The vibration element 14 is generally formed from a material which mechanically vibrates, such as elinver, iron-nickle alloy, quartz, glass, crystal, or ceramic.

The three sides of the vibration element 14, as shown in FIG. 3, are formed with piezoelectric elements 16a, 16b and 16c. The piezoelectric element 16a comprises a piezoelectric layer 18a formed from, for example, piezoelectric ceramic. Both sides of this piezoelectric layer 18a are formed with electrodes 20a and 22a, with one electrode 22a being bonded to the vibration element 14. In a similar manner, the piezoelectric elements 16b and 16c comprise piezoelectric layers 18b and 18c, respectively. Both sides of the piezoelectric layers 18b and 18c are formed with electrodes 20b and 22b, and electrodes 20c and 22c, respectively, with one electrode 22b and one electrode 22c being bonded to the vibration element 14. In this vibrator 12, for example, the piezoelectric elements 16a and 16b are used as detection sections for detecting a signal corresponding to a rotational angular velocity. The piezoelectric element 16c is used as a drive section for flexibly vibrating the vibration element 14.

Voltage detection circuits 224 and 226 are respectively connected to the piezoelectric elements 16a and 16b. In these voltage detection circuits 224 and 226, voltages output from the piezoelectric elements 16a and 16b are detected. For this purpose, resistors 27a and 27b are connected between the input ends of the voltage detection circuits 224 and 226 and intermediate points of the power supply voltage, respectively. As the voltage detection circuits 224 and 226, buffer circuits or the like are used. Since the input impedance of the buffer circuit is almost infinite, even if the output voltages of the piezoelectric elements 16a and 16b are detected, there is no variation in voltage due to the detection, and no influence is exerted upon the output signals of the voltage detection circuits 224 and 226.

The two voltage detection circuits 224 and 226 are connected to an adder circuit 28. In the adder circuit 28, the output signals of the voltage detection circuits 224 and 226 are synthesized. Here, the output ends of the voltage detection circuits 224 and 226 are connected via two resistors 30 and 32, and the output signals of the voltage detection circuits 224 and 226 are synthesized. The output signal of the adder circuit 28 is input to an oscillation circuit 134. The oscillation circuit 34 comprises an amplifier circuit 136 and a phase control circuit 138. In the amplifier circuit 136, the voltage level of the output signal of the adder circuit 28 is adjusted, and in the phase control circuit 138, the phase is adjusted. Then, the output signal of the oscillation circuit 134 is fed as a drive signal to the piezoelectric element 16c.

Further, the output signal of the adder circuit 28 is input to a monitor circuit 40. The monitor circuit 40 comprises a smoothing circuit 42 whereby the output signal of the adder circuit 28 is smoothed. Further, the monitor circuit 40 comprises a reference signal circuit 44. The reference signal circuit 44 outputs a fixed-level signal. The smoothing circuit 42 and the reference signal circuit 44 are connected to a comparator circuit 46. In the comparator circuit 46, the output signal voltage of the smoothing circuit 42 is compared with the output signal voltage of the reference signal circuit 44. According to the comparison result, a phase control signal for adjusting the phase of the output signal of the phase control circuit 138 is output. In the phase control circuit 138, the phase of the drive signal is adjusted in accordance with the phase control signal from the comparator circuit 46 so that the output signal voltage of the adder circuit 28 becomes constant.

Further, the voltage detection circuits 224 and 226 are connected to a differential amplifier circuit 48 whereby a difference between the output signals of the voltage detection circuits 224 and 226 is detected. The output signal of the differential amplifier circuit 48 is detected in synchronization with the signal of the adder circuit 28 by a synchronization detection circuit 50. The signal detected by the synchronization detection circuit 50 is smoothed by a smoothing circuit 52 and further amplified by an amplifier circuit 54.

In this vibration gyroscope 10, as a result of supplying a drive signal from the oscillation circuit 134 to the piezoelectric element 16c, the vibration element 14 flexibly vibrates in a direction intersecting at right angles to the surface on which the piezoelectric element 16c is formed. At this time, the flexed states of the piezoelectric elements 16a and 16b for detection are the same, and the same signal is output from these piezoelectric elements 16a and 16b. The output voltages of the piezoelectric elements 16a and 16b are detected by the voltage detection circuits 224 and 226. The detected signals are added together by the adder circuit 28, with the voltage and the phase being adjusted by the oscillation circuit 34, and this signal is fed as a drive signal to the piezoelectric element 16c. In this way, the vibrator 12 is self-excited.

While not in rotation, since the output signals of the piezoelectric elements 16a and 16b are the same, the output signal of the differential amplifier circuit 48 is "0". Therefore, it can be seen that no rotational angular velocity is applied to the vibration gyroscope 10. When the vibration gyroscope 10 rotates about the axis of the vibration element 14, the vibration direction of the vibration element 14 varies due to a Coriolis force. For this reason, the flexed states of the piezoelectric elements 16a and 16b vary, causing output signals from the piezoelectric elements 16a and 16b to vary. At this time, one of the flexings of the piezoelectric elements 16a and 16b is large, and the other flexing is small. Therefore, one of the output voltages of the piezoelectric elements 16a and 16b becomes large, and the other output voltage becomes small. These output voltages are detected by the voltage detection circuits 224 and 226, and a signal corresponding to the difference between the voltages is output from the differential amplifier circuit 48. That is, a signal corresponding to the amount of the change in the output signals of the piezoelectric elements 16a and 16b is output from the differential amplifier circuit 48.

The output signal of the differential amplifier circuit 48 is detected in synchronization with the signal of the adder circuit 28 by the synchronization detection circuit 50. As a result, only a positive component or a negative component of the output signal of the differential amplifier circuit 48 is detected. The output signal of the synchronization detection circuit 50 is smoothed by the smoothing circuit 52 and further amplified by the amplifier circuit 54. Therefore, the output signal of the amplifier circuit 54 is a signal corresponding to-the rotational angular velocity applied to the vibration gyroscope 10. By measuring this signal, the rotational angular velocity can be detected.

In this vibration gyroscope 10, the greater the rotational angular velocity, the greater the difference between the output signals of the piezoelectric elements 16a and 16b becomes, and the level of a signal obtained from the differential amplifier circuit 48 is increased. For this reason, the level of the DC signal output from the amplifier circuit 54 increases. In this way, the level of the output signal of the amplifier circuit 54 varies according to the rotational angular velocity applied to the vibration gyroscope 10. Therefore, by measuring the level of the output signal of the amplifier circuit 54, the magnitude of the rotational angular velocity can be known. Further, if the direction in which the rotational angular velocity is applied varies, the signals output from the piezoelectric elements 16a and 16b vary reversely. For this reason, the polarities of the signals detected by the synchronization detection circuit 50 are reversed, and the polarity of the signal obtained from the amplifier circuit 54 is also reversed. Therefore, by measuring the polarity of the signal output from the amplifier circuit 54, the direction of the rotational angular velocity can be known.

When a rotational angular velocity is applied to the vibration gyroscope 10, one of the output signals of the piezoelectric elements 16a and 16b is increased, and the other output signal is decreased. Therefore, if the output signals of the voltage detection circuits 224 and 226 are synthesized by the adder circuit 28, the amounts of the change in the output signals of the piezoelectric elements 16a and 16b are cancelled, and thus an almost fixed signal can be obtained. Therefore, if the phase and the voltage of the output signal from the adder circuit 28 are adjusted and formed into a drive signal, it is possible to cause the vibration element 14 to flexibly vibrate stably.

However, even if the vibration element 14 is flexibly vibrated with a drive signal having a fixed voltage, there are cases where the signal output from the vibrator 12 becomes unstable due to environmental changes or changes in the characteristics of the vibrator 12. For comparison, in this vibration gyroscope 10, the output signal of the adder circuit 28 is compared with the output signal of the reference signal circuit 44 by the comparator circuit 46, and the phase of the drive signal output from the phase control circuit 138 is controlled so that the output signal voltage of the adder circuit 28 is always constant. For this reason, it is possible to obtain a stable output signal from the piezoelectric elements 16a and 16b for detection regardless of changes in the characteristics of the vibrator 12. Therefore, it is possible to obtain a signal accurately corresponding to a rotational angular velocity from the piezoelectric elements 16a and 16b for detection. In response to this, the output signal of the amplifier circuit 54 also becomes a signal accurately corresponding to a rotational angular velocity. Therefore, measurement of the output signal of the amplifier circuit 54 makes it possible to accurately detect the rotational angular velocity applied to the vibration gyroscope 10.

Figure 10:
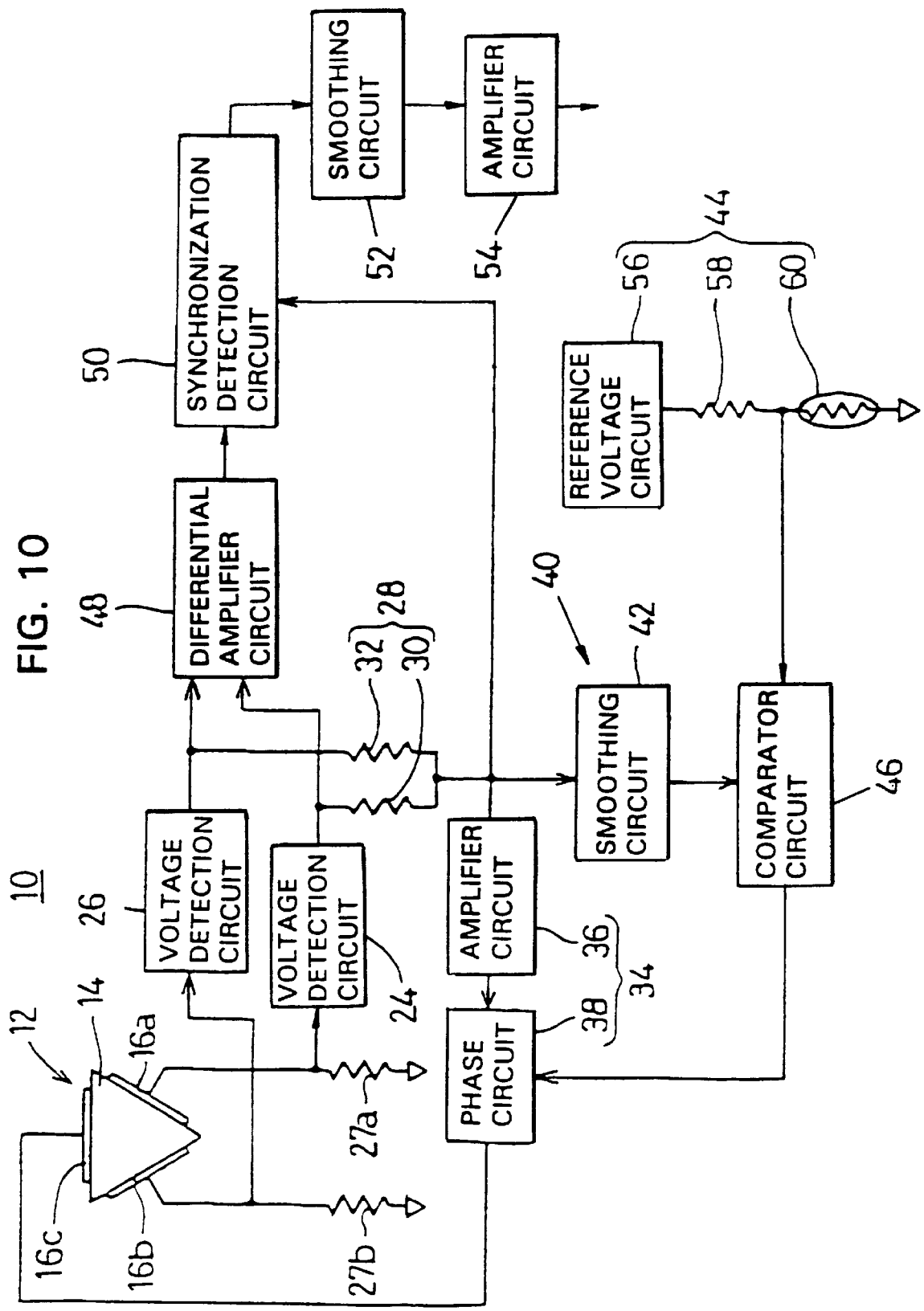
FIG. 10 is a diagram illustrating a sixth embodiment of the vibration gyroscope according to the present invention

FIG. 10 is a diagram illustrating a sixth embodiment of the vibration gyroscope of the present invention. As a reference signal circuit 44, a reference signal circuit which outputs a reference signal corresponding to changes in atmospheric temperature may be used. In this vibration gyroscope 10, a reference voltage circuit 56, a resistor 58 and a temperature-sensing element 60 form a reference signal circuit 44. As the temperature-sensing element 60, an element whose resistance value varies due to temperature, such as a thermistor or posistor, or an element whose voltage varies due to temperature, such as a diode, is used. Here, the resistor 58 and the thermistor serving as the temperature-sensing element 60 form a voltage-dividing circuit, and this voltage-dividing circuit divides the output signal of the reference voltage circuit 56. Therefore, the output signal of the reference signal circuit 44 becomes a voltage corresponding to changes in atmospheric temperature.

The output signal of the adder circuit 28 is compared with a reference signal corresponding to changes in atmospheric temperature by the comparator circuit 46. Then, the phase of the signal output from the phase control circuit 138 is adjusted so that the output signal voltage of the adder circuit 28 becomes a value corresponding to the reference signal voltage. That is, the flexing and vibration of the vibration element 14 is controlled so that the output signal voltage of the adder circuit 28 becomes a value corresponding to changes in atmospheric temperature. Therefore, it follows that the signal corresponding to the rotational angular velocity obtained from the piezoelectric elements 16a and 16b corresponds to changes in atmospheric temperature. For this reason, the signal obtained from the amplifier circuit 54 also becomes a signal corresponding to changes in atmospheric temperature, and thus measurement of this signal makes it possible to accurately detect the rotational angular velocity regardless of changes in atmospheric temperature.

The shape of the vibrator is not limited to a regular triangular prism, and the vibrator may be formed into other prismatic shapes, such as a tetragonal prism or a pentagonal prism, or cylindrical shapes. In other words, a vibration gyroscope using a vibrator having a plurality of piezoelectric elements for detection makes it possible to apply this invention by converting the output currents of the piezoelectric elements for detection into voltages by I–V conversion circuits and by synthesizing the voltages by an adder circuit. Further, the vibrator may be formed from a piezoelectric element. In such a case, for a drive section and a detection section, electrodes formed on a vibrator are used. Use of such a vibrator makes it possible to accurately detect a rotational angular velocity by monitoring an output signal of an adder circuit.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A vibration gyroscope, comprising:
    a vibrator having a drive section for vibrating said vibrator and a plurality of detection sections for outputting electric signals corresponding to the vibration state of said vibrator;
    a plurality of detection circuits for detecting said electric signals and generating a plurality of detection signals;
    a synthesis circuit for synthesizing said detection signals into a synthesized signal;
    a monitor circuit for monitoring said synthesized signal and for generating an adjusting signal as a function of said synthesized signal; and
    an oscillation circuit responsive to said adjusting signal and said synthesized signal for adjusting the phase of an output signal of said oscillation circuit and providing said oscillation circuit output signal to said drive section.

2. A vibration gyroscope according to claim 1, wherein said detection circuits comprise voltage detectors.

3. A vibration gyroscope according to claim 1, wherein said detection circuits comprise current-to-voltage conversion circuits.

4. A vibration gyroscope according to claim 1, wherein the synthesis circuit comprises an adder circuit.

5. A vibration gyroscope according to claim 1, wherein said oscillation circuit adjusts said phase of said oscillation circuit output signal so that the magnitude of said synthesized signal is constant.

6. A vibration gyroscope according to claim 5, wherein said monitor circuit generates an adjusting signal as a function of said synthesized signal.

7. A vibration gyroscope, comprising:
    a vibrator including a vibration element, a plurality of detection sections for outputting a plurality of electric currents corresponding to the vibration state of said vibration element, and a drive section for vibrating said vibration element;
    a plurality of current-to-voltage conversion circuits for converting each output current obtained from said plurality of detection sections into a plurality of voltages;
    an adder circuit for synthesizing said plurality of voltages into an adder output signal;
    a monitor circuit for monitoring said adder output signal and for generating an adjusting signal as a function of said adder output signal; and
    an oscillation circuit responsive to said adjusting signal and said adder output signal for adjusting the phase of an output signal of said oscillation circuit and providing said oscillation circuit output signal to said drive section.

8. A vibration gyroscope according to claim 7, wherein said monitor circuit comprises a smoothing circuit for smoothing said adder output signal, a reference signal circuit for outputting a signal which serves as a reference, and a comparator circuit for comparing the output signal of said smoothing circuit with the output signal of said reference signal circuit and outputting said adjusting signal for adjusting said phase of said output signal of said oscillation circuit so that the magnitude of said adder output signal becomes constant.

9. A vibration gyroscope according to claim 7, wherein said monitor circuit comprises a smoothing circuit for smoothing said adder output signal, a reference signal circuit for outputting a reference signal corresponding to temperature, and a comparator circuit for comparing the output signal of said smoothing circuit with the output signal of said reference signal circuit and outputting said adjusting signal for adjusting said phase of said oscillation circuit output signal so that the magnitude of said adder output signal is dependent on temperature.

10. A vibration gyroscope, comprising:
    a vibrator including a vibration element, a plurality of detection sections for outputting a plurality of electric currents corresponding to the vibration state of said vibration element, and a drive section for vibrating said vibration element;
    a plurality of voltage detection circuits for detecting and generating a plurality of detection voltages corresponding to said electric current;
    an adder circuit for synthesizing said plurality of detection voltages into an adder output signal;
    a monitor circuit for monitoring said adder output signal and for generating an adjusting signal as a function of said adder output signal;
    an oscillation circuit responsive to said adjusting signal and said adder output signal for adjusting the phase of an output signal of said oscillation circuit and providing said oscillation circuit output signal to said drive section.

11. A vibration gyroscope according to claim 10, wherein said monitor circuit comprises a smoothing circuit for smoothing said adder output signal, a reference signal circuit for outputting a signal which serves as a reference, and a comparator circuit for comparing the output signal of said smoothing circuit with the output signal of said reference signal circuit and outputting said adjusting signal for adjusting the phase of said oscillation circuit output signal so that the magnitude of said adder output signal becomes constant.

12. A vibration gyroscope according to claim 10, wherein said monitor circuit comprises a smoothing circuit for smoothing said adder output signal, a reference signal circuit for outputting a reference signal corresponding to temperature, and a comparator circuit for comparing the output signal of said smoothing circuit with the output signal of said reference signal circuit and outputting said adjusting signal for adjusting the phase of said oscillation circuit output signal so that the magnitude of said adder output signal is dependent on temperature.

* * * * *